(12) United States Patent
Jeon et al.

(10) Patent No.: US 11,814,590 B2
(45) Date of Patent: Nov. 14, 2023

(54) METHOD OF PRODUCING LUBRICATING BASE OIL FROM ATMOSPHERIC RESIDUE IN PYROLYSIS OIL DERIVED FROM WASTE PLASTIC

(71) Applicants: SK Innovation Co., Ltd., Seoul (KR); SK Geo Centric Co., Ltd., Seoul (KR)

(72) Inventors: Hee Jung Jeon, Daejeon (KR); Seung Woo Lee, Daejeon (KR); Yoon Kyung Lee, Daejeon (KR); Ho Won Lee, Daejeon (KR); Yeon Ho Kim, Daejeon (KR); Ka Young Kim, Daejeon (KR); Ok Youn Kim, Daejeon (KR); Young Moo Park, Daejeon (KR)

(73) Assignees: SK Innovation Co., Ltd., Seoul (KR); SK Geo Centric Co., Ltd., Seoul (KR)

(*) Notice: Subject to any disclaimer, the term of this patent is extended or adjusted under 35 U.S.C. 154(b) by 0 days.

(21) Appl. No.: 17/896,136

(22) Filed: Aug. 26, 2022

(65) Prior Publication Data
US 2023/0083199 A1    Mar. 16, 2023

(30) Foreign Application Priority Data
Aug. 27, 2021    (KR) .................. 10-2021-0113728

(51) Int. Cl.
*C10G 45/60*    (2006.01)
(52) U.S. Cl.
CPC ..... *C10G 45/60* (2013.01); *C10G 2300/1003* (2013.01); *C10G 2300/301* (2013.01); *C10G 2300/302* (2013.01); *C10G 2300/304* (2013.01); *C10G 2400/10* (2013.01)

(58) Field of Classification Search
None
See application file for complete search history.

(56) References Cited

U.S. PATENT DOCUMENTS

| | | | |
|---|---|---|---|
| 6,143,940 A | 11/2000 | Miller et al. | |
| 6,150,577 A | 11/2000 | Miller et al. | |
| 6,288,296 B1 | 9/2001 | Miller et al. | |
| 8,404,912 B1* | 3/2013 | Miller | C10G 1/10 585/734 |
| 2009/0163391 A1 | 6/2009 | Zakarian et al. | |

(Continued)

FOREIGN PATENT DOCUMENTS

| | | |
|---|---|---|
| CN | 101724426 A | 6/2010 |
| CN | 102226103 A | 10/2011 |

(Continued)

OTHER PUBLICATIONS

Miller et al., "Conversion of Waste Plastic to Lubricating Base Oil", Energy and Fuels, 2005, pp. 1580-1586, vol. 19, No. 4.

*Primary Examiner* — Vishal V Vasisth
(74) *Attorney, Agent, or Firm* — THE WEBB LAW FIRM (57) ABSTRACT

Provided are a method of producing a lubricating base oil composition including a) reacting at least a part of waste plastic pyrolysis oil having a boiling point in a range higher than 340° C. to remove impurities and structurally isomerizing the oil; and b) hydroisomerizing at least a part of the product of step a), and a lubricating base oil composition produced therefrom. A lubricating base oil, which has more methyl branches than petroleum-based lubricating base oil, to have improved low-temperature properties may be provided.

9 Claims, 3 Drawing Sheets

(56) References Cited

U.S. PATENT DOCUMENTS

2018/0187087 A1\* 7/2018 Atkins .................. C10G 1/002
2019/0161683 A1   5/2019 Narayanaswamy et al.
2019/0177652 A1\* 6/2019 Atkins ................ C10M 101/02

FOREIGN PATENT DOCUMENTS

EP          0697455 B1   9/2001
JP          2005268612 A 9/2005
WO          2018055555 A1 3/2018

\* cited by examiner

METHOD OF PRODUCING LUBRICATING BASE OIL FROM ATMOSPHERIC RESIDUE IN PYROLYSIS OIL DERIVED FROM WASTE PLASTIC

CROSS-REFERENCE TO RELATED APPLICATION

This application claims priority to Korean Patent Application No. 10-2021-0113728, filed Aug. 27, 2021, the disclosure of which is hereby incorporated by reference in its entirety.

BACKGROUND OF THE INVENTION

Field of the Invention

The following disclosure relates to a method of producing a Lube base oil from an atmospheric residue (AR) in waste plastic pyrolysis oil.

Description of Related Art

Plastic is one of the most innovative materials of the inventions of mankind, and has had a huge impact on human civilization, so that it is not an exaggeration to call the present age the age of plastic. A significantly large amount of plastic which is light and strong and allows adjustment of physical properties to satisfy the physical properties required in various fields has been used. However, it is difficult to decompose plastic in its natural state, and many environmental problems such as occurrence of large amounts of air pollution and hazardous substances are caused during an incineration process, which is becoming a social problem.

The biggest problem of plastic is that plastic has almost no biodegradability. It takes hundreds of years for plastic to decompose and disappear in the natural environment, and plastic is shattered in the process to become microplastic, which may cause various problems. In order to solve the problem, the used plastic should be recycled or reused, but out of 8.3 billion tons of plastic produced from 1950 to 2015, only 9% was recycled and 6.3 billion tons corresponding to 78% were disposed as waste. Since a ban on external export of waste plastic without the consent of foreign countries was negotiated in the Basel convention in Switzerland in May 2019, the importance of a waste plastic treatment technology is greatly increasing.

One of the methods of reusing waste plastic is to convert plastic into an oil fraction by pyrolysis and replace a conventional petroleum-based oil fraction with the oil fraction. However, since the oil fraction recovered by pyrolysis contains large amounts of various impurities such as S, N, O, olefins, and Cl, a post-processing technology for removing impurities is separately required.

The oil fraction from which impurities have been removed by the post-processing technology may be converted into petrochemical products, and a representative of the petrochemical products is a lubricating oil. Materials used for reducing friction are collectively called lubricating oil, which is a mixture of materials of various functions, but mainly refers to a mixture of a lubricating base oil and an additive. A lubricating base oil is a material accounting for 80 to 90% corresponding to most of the lubricating oil, is a main material determining the physical property level of the lubricating oil, and is mostly formed of hydrocarbons, and a lack of the physical properties due to the lubricating base oil is corrected with the remaining 10 to 20% of an additive material.

Generally, the lubricating base oil is produced by separating a heavy oil fraction having a boiling point in a range of 340° C. or higher (C22 or more carbon atoms) from a petroleum-based oil fraction, hydrogenating the heavy oil to remove N, S, an unsaturated double bond, O, and the like, and then performing a hydroisomerization reaction.

The lubricating base oil may be used in a product range in various fields of application depending on kinematic viscosity (@100° C.), and the most versatile and most used lubricating base oil is a low-kinematic viscosity lubricating base oil having a kinematic viscosity of 4 cSt. The reason why the amount of low-kinematic viscosity lubricating base oil used is increased is that since social need to reduce vehicle $CO_2$ emissions is increased, the importance of fuel efficiency improvement technology is highlighted, a frictional force is decreased with a lower kinematic viscosity of the lubricating base oil used, which increases fuel efficiency, and thus, the amount of low-kinematic viscosity lubricating base oil used is greatly increased.

Related Art Document 1 (U.S. Pat. Registration No. 6,150,577) discloses a technology of producing lubricating base oil by pyrolyzing waste plastic to recover pyrolysis oil, separating a heavy oil fraction having a boiling point of 650° F. or higher from a refined oil fraction, removing impurities by a hydrotreatment, and performing a hydroisomerization treatment. However, in Related Art Document 1, impurities are removed by a hydrotreatment to saturate an unsaturated double bond by hydrogenation, so that no olefin exists, and a structural isomerization reaction by an olefin may not be sufficiently performed.

Related Art Document 2 (U.S. Pat. Registration No. 6,288,296) discloses a technology of producing lubricating base oil having a high kinematic viscosity (@100° C.) of 8 cSt by pyrolyzing waste plastic to recover pyrolysis oil, separating heavy oil having a boiling point of 650° F. or higher from a refined oil fraction, performing a dimerization treatment, removing impurities by hydrogenation, and then performing a structural isomerization treatment. However, in Related Art Document 2, considering that the content of impurities such as N, Cl, and S in pyrolysis oil dimerized using a metal/zeolite catalyst is high, operation durability is low, and a process of removing impurities is added to increase process complexity. In addition, a heavy oil fraction of 650° F. or higher is hydrogenated to convert the oil fraction into paraffin, which is hydroisomerized to produce lubricating base oil. Thus, a hydrogenated structural isomerization reaction selectively occurs only at the end of a hydrocarbon molecule to produce a high viscosity lubricating base oil. Related Art Document 2 also does not disclose a technology of converting a light oil fraction of 650° F. or lower to a lubricating base oil.

From the related art documents, it is difficult to manufacture a low kinematic viscosity lubricating base oil product having improved low-temperature properties by producing a branch in the middle of a hydrocarbon. In the case of selectively converting a middle distillate having a boiling point in a range of 180 to 340° C. in waste plastic pyrolysis oil into a lubricating base oil having a useful kinematic viscosity (@100° C.) of 4 cSt in the lubricating base oil, the ripple effect is expected to be large in the related art.

SUMMARY OF THE INVENTION

Conventionally, since the pyrolysis oil of waste plastic is subjected to a hydrotreatment method as a method of removing chlorine (Cl), sulfur (S), nitrogen (N), and the like, a large amount of olefins is saturated by the hydrotreatment, there is a methyl branch in the middle and at the end of the branch of the molecule, and thus, it is difficult to produce lubricating base oil having improved low-temperature properties. An embodiment of the present invention is directed to structurally isomerize pyrolysis oil AR of high impurities which is difficult to apply as lubricating base oil, using a solid acid material which removes impurities and also derives a shift reaction and a branching reaction of olefins, and then selectively produce only lubricating base oil having a kinematic viscosity of 3.9 to 4.7 cSt by a hydroisomerization reaction.

The lubricating base oil produced by the present invention has a high content of branched olefins and a low content of naphthenes to show superior physical properties to petroleum-based lubricating base oil having a relatively high naphthene content, and allows selective production of only a lubricating base oil having a kinematic viscosity of 3.9 to 4.7 cSt.

In one general aspect, a method of producing a lubricating base oil composition includes: a process or step a) reacting at least a part of waste plastic pyrolysis oil having a boiling point in a range higher than 340° C. to remove impurities and structurally isomerize the oil; and a process or step b) hydroisomerizing at least a part of the product of the process (step) a).

Before the process of a), a process of separating at least a part of the waste plastic pyrolysis oil into a first oil fraction, a second oil fraction, and a third oil fraction may be further included, wherein the first oil fraction has a boiling point of higher than 340° C., the second oil fraction has a boiling point of lower than 180° C., and the third oil fraction has a boiling point of 180 to 340° C.

In the process a), the waste plastic pyrolysis oil may include 10 wt % of olefins with respect to the total weight.

The process a) may include reacting at least a part of the waste plastic pyrolysis oil with a solid acid material.

The solid acid material may be zeolite, clay, silica-alumina-phosphate (SAPO), aluminum phosphate (ALPO), metal organic framework (MOF), silica alumina, or a mixture thereof.

The solid acid material may be included at 3 to 30 wt % with respect to the total weight of the waste plastic pyrolysis oil and the solid acid material.

The waste plastic pyrolysis oil from which impurities have been removed by the process a) may include less than 10 ppm of chlorine and 5 vol % or less of olefins with respect to the total weight.

The process a) of removing impurities and structurally isomerizing may satisfy the following Relation 1:

$$5 < A - B < 30$$ [Relation 1]

wherein A and B are pour points of the waste plastic pyrolysis oil before structural isomerization (A) and after structural isomerization (B), respectively.

The process b) includes reacting at least a part of the product of the process a) with a hydroisomerization catalyst, and the hydroisomerization catalyst may include at least one metal selected from the group consisting of platinum (Pt), palladium (Pd), nickel (Ni), iron (Fe), copper (Cu), chromium (Cr), vanadium (V), and cobalt (Co); and at least one support selected from the group consisting of alumina, silica, silica-alumina, zirconia, ceria, titania, zeolite, and clay.

In the process b), a process or step c) of separating the hydroisomerized waste plastic pyrolysis oil by boiling points may be further included.

The process b) of hydroisomerizing may satisfy the following Relation 2:

$$0.95 < C/D < 1.05$$ [Relation 2]

wherein C and D are weight average molecular weights of the waste plastic pyrolysis oil from which impurities have been removed before hydroisomerization (C) and after hydroisomerization (D), respectively.

In another general aspect, a lubricating base oil composition produced from the waste plastic pyrolysis oil having a boiling point in a range higher than 340° C. is provided, wherein the lubricating base oil composition has a kinematic viscosity (@100° C.) of 3.9 to 4.7 cSt.

The lubricating base oil composition may have a viscosity index of 120 or more and a pour point of −20° C. or lower.

The lubricating base oil composition may have a viscosity index of 140 or more and a pour point of −60 to −20° C.

Other features and aspects will be apparent from the following detailed description, the drawings, and the claims.

DESCRIPTION OF THE INVENTION

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, "A to B" refers to "A or more and B or less", unless otherwise particularly defined.

In addition, "A and/or B" refers to at least one selected from the group consisting of A and B, unless otherwise particularly defined.

In the present specification, unless otherwise defined, boiling points (bp) of a first oil fraction, a second oil fraction, and a third oil fraction refer to those measured at normal pressure (1 atm).

In the present specification, unless otherwise defined, waste plastic pyrolysis oil having a boiling point in a range higher than 340° C. refers to pyrolysis oil of which 70% or more, 80% or more, 90% or more, 95% or more, or as an example, 100% has a boiling point in a range higher than 340° C. with respect to the total weight of the waste plastic pyrolysis oil.

A method of producing a lubricating base oil composition according to an exemplary embodiment of the present invention is provided. The method includes: a process or step a) reacting at least a part of waste plastic pyrolysis oil having a boiling point in a range higher than 340° C. to remove impurities and structurally isomerize the oil; and a process or step b) hydroisomerizing at least a part of the product of the process (step) a).

An exemplary embodiment of the present invention may further include: a process of separating at least a part of the waste plastic pyrolysis oil into a first oil fraction, a second oil fraction, and a third oil fraction, before the process of a), wherein the first oil fraction has a boiling point of higher than 340° C., the second oil fraction has a boiling point of lower than 180° C., and the third oil fraction has a boiling point of 180 to 340° C. At the separation process, a known fractional distillation method such as atmospheric distillation and reduced pressure distillation may be applied.

The waste plastic pyrolysis oil having a boiling point in a range higher than 340° C. as the first oil fraction separated may include an oil fraction of C21 or more. The first oil fraction may include 30 to 90 wt % of normal paraffins, 0.1 to 30 wt % of isoparaffins, 0.1 to 90 wt % of olefins, 0.1 to 20 wt % of naphthene, and 0.1 to 20 wt % of an aromatic compound, preferably 40 to 70 wt % of normal paraffins, 0.1 to 10 wt % of isoparaffins, 5 to 60 wt % of olefins, 0.1 to 5 wt % of naphthene, and 0.1 to 5 wt % of an aromatic compound.

Specifically, the waste plastic pyrolysis oil having a boiling point in a range higher than 340° C. may include at least 10 wt o, 10 to 90 wt o, or 10 to 60 wt % of olefins.

In addition, the first oil fraction may include 1 to 5,000 ppm of Cl, 1 to 1,000 ppm of S, and/or 10 to 5,000 ppm of N, specifically 5 to 1,000 ppm of Cl, 5 to 100 ppm of S, and/or 10 to 1,000 ppm of N, and more specifically 5 to 100 ppm of Cl, 5 to 80 ppm of S, and/or 10 to 700 ppm of N, as impurities.

The first oil fraction may be present in a wax form at room temperature. The first oil fraction may be converted into the lubricating base oil of the present invention by structural isomerization and hydroisomerization, after removing impurities (such as Cl, N, and S) which may cause catalyst deactivation and process abnormality according to process standards.

The second oil fraction and the third oil fraction are waste plastic pyrolysis oil having boiling points of lower than 180° C. and 180 to 340° C., respectively, and the second oil fraction may include a C8 or lower oil fraction and the third oil fraction may include a C9 to C20 oil fraction. The second oil fraction and the third oil fraction include a high content of linear hydrocarbons and a content ratio between a paraffin and an olefin may be partly varied depending on the method of producing waste plastic pyrolysis oil, but generally have a higher ratio of paraffin, include a small amount of branched hydrocarbons, and may include a small amount of naphthenes and aromatics resulted from the waste plastic pyrolysis oil. Since the second oil fraction has an impurity content higher than those of the first oil fraction and the third oil fraction, and requires a high-level impurity treatment technology, it is not preferred in terms of economic feasibility by productization. The third oil fraction having a boiling point in a range of 180 to 340° C. has a low kinematic viscosity due to the relatively low number of carbon atoms and has a low content of impurities such as S, N, olefins, and Cl, and thus, it is difficult to apply the third oil fraction as lubricating base oil.

The waste plastic pyrolysis oil may further include biomass pyrolysis oil, regenerated lubricating oil, crude oil having a high chlorine content, or a mixture thereof. Since a large amount of impurities produced by a cracking or pyrolysis reaction of waste materials such as waste plastic pyrolysis oil includes a large amount of impurities caused by waste materials, there is a risk of air pollutant emission when using the waste plastic pyrolysis oil, and in particular, a Cl component is converted into HCl in a treatment process at high temperature and discharged or causes device corrosion, it is necessary to pretreat the waste plastic pyrolysis oil to remove impurities.

In addition, the waste plastic pyrolysis oil may include H-Naphtha (~C8, bp<150° C.) and middle distillate (C9~C20, bp 150~340° C.): VGO/AR (C21~, bp>340° C.) at a weight ratio of 50:50 to 90:10, at a weight ratio of 50:50 to 80:20, at a weight ratio of 50:50 to 70:30, or at a ratio of 50:50 to 60:40. The waste plastic pyrolysis oil used in the present invention may not proceed with oil hardening by catalytic cracking in the production of waste plastic pyrolysis oil. Since the waste plastic pyrolysis oil is applied as a raw material, a selectivity of lubricating base oil having a kinematic viscosity of 4 cSt during the waste plastic pyrolysis is low, but the production method of the present invention is applied to waste plastic pyrolysis oil to produce a lubricating base oil composition having a final kinematic viscosity of about 4 cSt in a high yield. The object of the present invention is to separate linear hydrocarbons having a VGO/AR boiling point range (C21~, bp>340° C.), which is post-treated and then applied as lubricating base oil. In addition, in the present invention, high-quality lubricating base oil having a kinematic viscosity of 3.9 to 4.7 cSt, 4.0 to 4.7 cSt, 4.1 to 4.7 cSt, or 4.2 to 4.7 cSt may be produced by an additional structural isomerization treatment in the hydroisomerization process (post-treatment).

The process a) of removing impurities and structurally isomerizing is to react at least a part of the waste plastic pyrolysis oil having a boiling point in a range higher than 340° C. to remove impurities and structurally isomerize the oil, and it is preferred to react at least a part of the waste plastic pyrolysis oil and a solid acid material.

In the present invention, the reaction of removing a chlorine impurity included at a high content in the waste plastic pyrolysis oil may be largely classified into two types. One type may be to convert chlorine in a hydrocarbon structure into HCl by a reaction by an active site of a solid acid catalyst, and then discharge converted HCl or HCl with a small amount of organic Cl. The other type may be to directly bond Cl to an active site of the solid acid material and remove it. However, a hydrotreating (HDT) process as a conventional technology is a technology of removing Cl by hydrogen injection ($H_2$ feeding), and specifically, organic-Cl in an oil vapor form may be removed. This is not preferred since the waste plastic pyrolysis oil cracked by the hydrogenation reaction reacts with Cl to form organic-Cl to increase gassing, and thus, a product loss is large and the content of an olefin component included in the waste plastic pyrolysis oil may be increased.

In the present invention, a structural isomerization reaction of pyrolysis oil and a reaction of reducing impurities such as Cl and N occur in one reaction, and the present invention is different from the sequential combination of a conventional technology of reducing Cl and N by an adsorbent and a conventional technology of subjecting a refined oil fraction to structural isomerization. In the conventional technology, Cl may be reduced by introducing an adsorbent such as CaO to convert Cl in pyrolysis oil into HCl, N may be reduced by converting N in pyrolysis oil into $NH_3$ by a hydrotreatment, and also, the refined oil fraction as such may be converted into a branched olefin or internal olefin oil fraction by a structural isomerization catalytic reaction. However, it may be very difficult or impossible to derive both the reduction of Cl and N and the structural isomerization reaction at the same time in one reactor by the conventional technology.

In addition, the conventional technology of reducing Cl, N, and the like by an adsorbent does not perform oligomerization by a solid acid catalyst such as zeolite, and when a Ziegler-Natta catalyst system such as $AlCl_3$ or a metallocene catalyst system is used, a raw material oil fraction having a very low impurity content is required, and thus, the adsorbent should be used in a very high content (2 to 50 times the level of the oil fraction to be refined). In addition, since the material to which Cl, N, and the like are adsorbed loses adsorption ability, a deactivated adsorbent should be continuously replaced. Due to the characteristics in that the amount of adsorbent required is very large as compared with an oil fraction and the continuous replacement of the adsorbent is needed, it is difficult to derive reduction of impurities by an adsorbent and a structural isomerization reaction in one reactor.

In another conventional technology, Cl and N may be removed by converting them into HCl and $NH_3$ by a hydrogenation reaction, not adsorption reduction. However, in this case, since not only the reaction of conversion into HCl and $NH_3$ and removal is performed in the hydrogenation reaction process, but also unsaturated double bonds in the oil fraction are saturated by the hydrogenation, there is no olefin in the hydrogenated oil fraction and the structural isomerization reaction may not be sufficiently derived.

For this reason, conventionally, it is difficult to apply the method of removing Cl, N, and the like by adsorption or a hydrogenation reaction and a structural isomerization catalyst reaction in combination as one reaction.

The present invention uses a solid acid material, thereby using the acid site of the solid acid material as the active site of the structural isomerization reaction and also deriving adsorption of Cl or conversion into HCl to remove Cl. In addition, since N is bonded to the acid site of the solid acid material and removed by neutralization, the same solid acid material is introduced to one simple reactor, and both reduction of impurities and structural isomerization may be performed. In addition, since an oligomerization reaction may also proceed, products having various physical properties with low-temperature properties being adjusted may be manufactured with the same raw material by changing operation conditions in the structural isomerization reaction such as a branching reaction and a shift reaction of olefins, and the manufacturing yield of the lubricating base oil may be increased.

The process a) of removing impurities and structurally isomerizing may be performed in a pressure of 1 bar or more and 100 bar or less under an inert gas atmosphere and at a temperature of 200° C. or higher and lower than 380° C.

Specifically, the process of removing impurities may be performed under pressure conditions of 1 to 100 bar of Ar or $N_2$, 1 to 60 bar of Ar or $N_2$, or 1 to 40 bar of Ar or $N_2$. When the reaction is carried out under high vacuum or low vacuum conditions of less than 1 bar, a catalytic pyrolysis reaction occurs to decrease the viscosity and the molecular weight of the pyrolysis oil and change the composition of the oil product. In particular, since Cl is bonded to an olefin to form organic-Cl and removed as oil vapor, a product loss may occur. However, when the pressure is more than 100 bar, reactor operation is difficult and process costs are increased, which is thus not preferred.

The process of removing impurities may be performed at 200 to 380° C., 230 to 360° C., 240 to 340° C., or 260 to 335° C., preferably 260 to 280° C. or 295 to 335° C. As the temperature is raised in the temperature range described above, a Cl reduction effect may be increased, but at an excessively high temperature, cracking reaction activity is increased to decrease the selectivity of an oil fraction having a boiling point in a range of 340° C. or higher which may be applied as the lubricating base oil, which is thus not preferred. Specifically, low-temperature operation at lower than 200° C. may greatly decrease a conversion catalytic reaction in which chlorine (Cl) contained in the waste plastic pyrolysis oil is converted into hydrochloric acid (HCl). Since the catalyst content, reaction temperature/time, and the like should be increased for supplementing this, it may be somewhat disadvantageous from an economic point of view for treating the waste plastic pyrolysis oil having a high content of Cl. In addition, high-temperature operation at higher than 380° C. activates a cracking reaction, which may lead to a decrease in an oil fraction yield by an increase in the amount of a gas component produced.

The solid acid material includes a Bronsted acid, a Lewis acid, or a mixture thereof, and specifically, may be a solid material in which a Bronsted acid site or a Lewis acid site is present, and the solid acid material may be zeolite, clay, silica-alumina-phosphate (SAPO), aluminum phosphate (ALPO), metal organic framework (MOF), silica alumina, or a mixture thereof.

Meanwhile, the solid acid material is a solid material having a site capable of donating $H^+$ (Bronsted acid) or accepting a lone pair of electrons (Lewis acid), and allows derivation of various reactions such as cracking, alkylation, and neutralization depending on energy at an acid site. In the present invention, the solid acid material is activated in specific process conditions, thereby carrying out a catalytic conversion reaction to convert Cl into HCl. As a result, a high content of Cl in the waste plastic pyrolysis oil may be reduced to a several ppm level, and product abnormality (for example, cracking) and a yield loss (in the case in which Cl is removed as organic Cl, the case in which the oil is cracked and removed as gas, and the like) may be minimized.

The solid acid material may be zeolite, clay, silica-alumina-phosphate (SAPO), aluminum phosphate (ALPO), metal organic framework (MOF), silica alumina, or a mixture thereof.

In addition, as the solid acid material, waste zeolite, waste clay, and the like which are discarded after use in a petrochemical process may be used as they are or may be used after a simple treatment for further activity improvement. For example, a fluidized bed catalyst is used in a RFCC process in which a residual oil is converted into a light/middle distillate, and in order to maintain the entire activity of the RFCC process constant, a certain amount of catalyst in operation is replaced with a fresh catalyst every day, and the replaced catalyst herein is named RFCC equilibrium catalyst (E-Cat) and discarded entirely. RFCC E-Cat may be used as the solid acid material of the present invention, and the RFCC E-Cat may be formed of 30 to 50 wt % of zeolite, 40 to 60 wt % of clay, and 0 to 30 wt % of other materials (alumina gel, silica gel, functional material, and the like). By using RFCC E-Cat as the solid acid material for reducing Cl in the waste plastic pyrolysis oil having a high content of Cl, a difference in cracking activity from the fresh catalyst is small, and costs are reduced through environmental protection and reuse.

A simple treatment may be needed in order to use the waste zeolite, the waste clay, and the like as the solid acid material of the process of the present invention, and when a material such as coke or oil physically blocks the active site of the solid acid material, it is preferred to use the solid acid material after removing coke, oil, or the like. Air burning may be performed for removing coke, or a solvent treatment may be performed for oil removal. If necessary, when the metal component affects the active site of the solid acid material and deactivates the active site, a DeMet process in which a treatment with a weak acid or dilute hydrogen peroxide at a medium temperature is performed to remove the metal component may be applied.

As an example, a catalyst used for reducing impurities in the present invention may be subjected to air burning under a simple atmosphere to regenerate an active site. Catalyst regeneration may be performed by the air burning at 450 to 550° C. under the atmosphere. Nitrogen ($N_2$) stripping performed at 450 to 550° C. under a nitrogen atmosphere may regenerate some active sites of the catalyst, but is not effective as compared with air burning.

In the process a), the solid acid material may be included at 3 to 30 wt %, preferably 3 to 10 wt % or 5 to 10 wt % with respect to the total weight of the waste plastic pyrolysis oil and the solid acid material. Within the range, as the amount of the solid acid material introduced is increased, a Cl removal effect may be improved, and when the amount is 30 wt % or less, a cracking reaction in the oil fraction may be suppressed, thereby structurally isomerizing the waste plastic pyrolysis oil simultaneously with Cl removal.

In the process a), the waste plastic pyrolysis oil from which the impurities have been removed may include less than 10 ppm, 7 ppm or less, 6 ppm or less, 4 ppm or less, or 2 ppm or less of chlorine. Within the range of the chlorine content, in the process b) of hydroisomerizing, production of organic-Cl in an oil vapor form may be suppressed, production of organic-Cl by a reaction between some cracked waste plastic pyrolysis oil and residual Cl may be suppressed, and an increase in the content of the olefin component may be suppressed. Thus, a lubricating base oil composition having a high content of isoparaffin may be produced in a high yield.

The waste plastic pyrolysis oil from which impurities have been removed may include 5 wt % or less, 3 wt % or less, or 0.1 to 3 wt % of olefins with respect to the total weight. As the olefin content is high, the amount of $H_2$ consumed to be used in saturation in the hydroisomerization treatment process is increased, so that it is difficult to secure economic feasibility, and the amount of oil vapor produced in the process b) of hydroisomerizing is increased, so that a product loss may occur.

When Cl is removed from the waste plastic pyrolysis oil according to the present invention, the average molecular weight and/or the viscosity of the waste plastic pyrolysis oil may be somewhat increased by the structural isomerization reaction of olefins and the alkylation reaction between an olefin and branched paraffin in the waste plastic pyrolysis oil, and thus, the oligomerized oil fraction capable of applying to the lubricating base oil may be produced in a high yield.

The process a) of removing impurities and structurally isomerizing may satisfy the following Relation 1:

$$5<A-B<30 \quad \text{[Relation 1]}$$

wherein A and B are pour points of the waste plastic pyrolysis oil before structural isomerization (A) and after structural isomerization (B), respectively.

Figure 1:
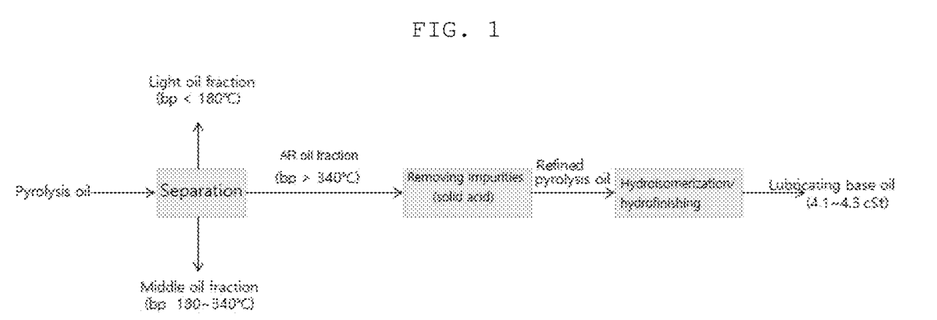
FIG. 1 is a schematic diagram of a method of producing a lubricating base oil composition with an AR oil fraction having a boiling point in a range higher than 340° C. in waste plastic pyrolysis oil, according to an exemplary embodiment of the present invention.
Figure 2:
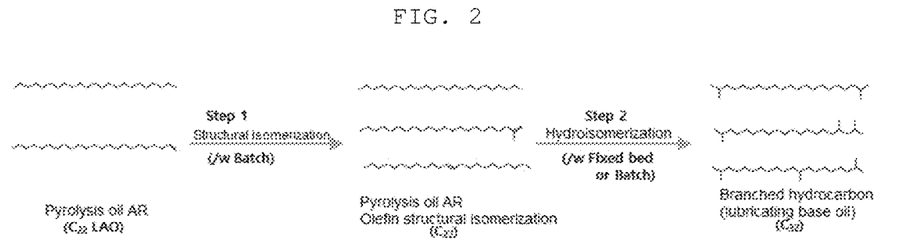
FIG. 2 is a schematic diagram showing an oil fraction composition according to each process of the method of producing lubricating base oil of the present invention.

Specifically, $10<A-B<30$, and preferably $15<A-B<30$ may be satisfied. When the range is satisfied, it is recognized that the structural isomerization reaction sufficiently occurs, and high-quality lubricating base oil having more methyl branches than conventional petroleum-based lubricating base oil may be produced. FIG. 2 is a schematic diagram showing an oil fraction composition according to each process of the method of producing lubricating base oil of the present invention. Referring to FIG. 2, the low-temperature properties of the oil fraction may be improved by the structural isomerization reaction to produce a methyl branch at the position of an olefin in the process a) of the present invention. Meanwhile, the pour point may be measured by ASTM D97.

Subsequently, the process b) is for removing olefins in the oil fraction and increasing the content of branched hydrocarbons, and is a process of hydroisomerizing at least a part of the product of the process a).

In the process a), even though the oil fraction including oligomer in the form of branched hydrocarbon is produced, the produced oligomer component has insufficient low-temperature properties to directly apply it to the lubricating base oil. This is because the ratio of linear hydrocarbons in the oligomer is still high, and in order to improve insufficient low-temperature properties, molecular branching may be further performed. In addition, impurities such as S, N, O, and Cl which have not been removed in process a) and remain in the oil fraction may also be removed in the hydroisomerization process.

In the present invention, in the process (a), the impurities are removed without the hydroisomerization treatment, and then the process b) of hydroisomerizing proceeds, so that the contents of chlorine and olefins in the oil fraction may be decreased to a very small amount, and also, low-temperature properties may be improved by branching of the hydrocarbon molecular end of the waste plastic pyrolysis oil, thereby achieving high-quality lubricating base oil physical properties.

Specifically, in the process b), the waste plastic pyrolysis oil from which impurities have been removed may be subjected to a hydroisomerization (hydrobranching) reaction to produce a branched hydrocarbon.

In order to use it as the lubricating base oil, there should be substantially no olefin in the oil fraction. However, since the waste plastic pyrolysis oil generally has a very high content of olefins of 50 mol %, the olefin content is present at several mol % or more even after removing the impurities by the solid acid material, and thus, it may be difficult to apply it directly to the lubricating base oil. Therefore, it is preferred to remove the unsaturated double bond present in the molecule by saturating the double bond with hydrogen ($H_2$) by the hydroisomerization treatment. In the method of producing a lubricating base oil composition of the present invention, a common hydrogenation reaction for removing an unsaturated double bond is not performed, but it is characterized in that molecular branching is performed while an unsaturated double bond is removed by the hydroisomerization reaction.

The hydroisomerization reaction of the process b) may be performed under the conditions of a temperature of 140 to 400° C. and a $H_2$ pressure of 20 to 200 bar. Specifically, the hydroisomerization reaction of the process b) may be performed under the conditions of a temperature of 150 to 350° C. and a $H_2$ pressure of 20 to 150 bar, 20 to 130 bar, 20 to 100 bar, 20 to 80 bar, or 20 to 50 bar. The hydroisomerization reaction is performed under the relatively low temperature and pressure conditions, thereby further improving the yield of the branched hydrocarbon. The $H_2$ pressure range is characterized by being very low as compared with the pressure range of the hydroisomerization reaction of 160 to 250 bar in a general oil refining process. Thus, in the present invention, the branched hydrocarbon may be a branched hydrocarbon having one or two or more, preferably four or more branch structures, and may provide high-quality lubricating base oil having improved low-temperature properties.

In the hydroisomerization reaction of the process b), a catalyst used in the hydroisomerization reaction in a common oil refining process may be used without particular limitation. The catalyst may be, for example, a catalyst in the form in which at least one metal selected from platinum (Pt), palladium (Pd), nickel (Ni), iron (Fe), copper (Cu), chromium (Cr), vanadium (V), and cobalt (Co) is supported on at least one support selected from alumina, silica, silica-alumina, zirconia, ceria, titania, zeolite, and clay.

The zeolite may be, for example, a mesopore zeolite (e.g., EU-1, ZSM-35, ZSM-11, ZSM-57, NU-87, ZSM-22, EU-2, EU-11, ZBM-30, ZSM-48, ZSM-23, or a combination thereof), but is not limited thereto.

In addition, the content of the metal component in the catalyst may be, for example, in a range of about 0.1 to 3 wt o, specifically about 0.3 to 1.5 wt %, and more specifically, about 0.3 to 1 wt %.

The hydroisomerization reaction of the process b) may be performed using a batch reactor or a fixed bed reactor, and when the fixed bed reactor is used, the reaction may be operated in a continuous manner, which is preferred in terms of productivity. When the fixed bed reactor is used, the reaction may be performed with a supply of a hydrogen gas, and an inert gas such as nitrogen, argon, and helium is mixed therewith for increasing reaction stability. A flow rate of the hydrogen gas to be introduced to the fixed bed reactor may be considered as one of the factors controlling reaction activity. Specifically, since the reaction is performed by a contact between a catalyst and a reactant, a retention time may be considered for controlling the reaction. Meanwhile, a weight hour space velocity (WHSV) using the fixed bed reactor may be adjusted to the range of, for example, 0.01 to 50 $hr^{-1}$, specifically 0.1 to 3 $hr^{-1}$, and more specifically 0.5 to 1.5 $hr^{-1}$.

The process b) of hydroisomerizing of the present invention may produce 3 wt % or less, 1 wt % or less, preferably 0.1 to 1 wt % of oil vapor with respect to the total weight of the waste plastic pyrolysis oil from which impurities have been removed. In the conventional technology, a hydrocracking catalyst including zeolite is used to produce 10 wt % or more of the oil vapor in a hydrogenation reaction, but in the present invention, a hydroisomerization catalyst is used and an oil fraction having a reduced content of impurities (chlorine) and olefins is used as a raw material to suppress occurrence of oil vapor, and the lubricating base oil composition desired in the present invention may be obtained in a high yield.

The hydroisomerization treatment process of the present invention may satisfy the following Relation 2:

$$0.95 < C/D < 1.05 \qquad \text{[Relation 2]}$$

wherein C and D are weight average molecular weights of waste plastic pyrolysis oil from which impurities have been removed before and after hydroisomerization, respectively. Specifically, in Relation 2, C may be a weight average molecular weight of the product of the process b) and D may be a weight average molecular weight of the product of the structural isomerization treatment of the process a).

As described above, the molecular weight distribution (boiling point distribution) in the waste plastic pyrolysis oil before and after the hydroisomerization treatment may be maintained at a constant level, thereby producing a C22-C40 lubricating base oil composition in a high yield.

In addition, the process b) of hydroisomerization may further include a hydrofinishing reaction by a hydrofinishing catalyst.

As the catalyst, a catalyst used in the hydrogenation reaction during a common oil refining process may be used without particular limitation. Specifically, as a hydrogenation metal, a metal selected from Groups 6, 8, 9, 10, 11, and 12 of the periodic table, more specifically, Pt, Pd, Ni, Fe, Cu, Cr, V, Co, and the like may be used alone or in combination. More specifically, Pt and/or Pd may be used. In addition, the metal component supported on an inorganic oxide support, specifically, at least one or more supports of alumina, silica, silica-alumina, zirconia, ceria, titania, zeolite (e.g., Y zeolite, specifically, SAR of 12 or more), clay, SAPO, and AlPO, may be used.

The hydrofinishing step may be performed in ranges of, for example, a temperature of 150 to 500° C., specifically 180 to 350° C., and more specifically 200 to 350° C., a $H_2$ pressure of 5 to 200 bar, preferably 20 to 180 bar, and a $H_2$/feed ratio (GOR) of 300 to 2000 $Nm^3/m^3$, preferably 500 to 1500 $Nm^3/m^3$. In addition, when a continuous reaction, for example, a CSTR reactor is used, the hydrofinishing step may be performed at a weight hour space velocity (WHSV) of 0.1 to 5 $hr^{-1}$, 0.1 to 3 $hr^{-1}$, or 0.1 to 1 $hr^{-1}$.

In addition, a pretreatment hydrogenation process of selectively removing the conjugated diolefin in the olefin before the process b) of hydroisomerization may be further included. The conjugated diolefin may be converted into gum and the like by forming an oligomer during a reaction process to derive operation trouble. Thus, it is preferred that a pretreatment hydrogenation process of selectively removing the conjugated diolefin from the oil fraction, if necessary, depending on its content is performed before the process b) of hydroisomerization.

The pretreatment hydrogenation process may be performed at 40 to 300° C. and at a $H_2$ partial pressure of 5 to 100 bar. Since under the pretreatment hydrogenation process operation conditions, the conjugated diolefin may be removed easily as compared with the cases of removing an unsaturated double bond and impurities such as S and N, the conditions may be generally a mild condition as compared with the hydrogenation process operation conditions.

Meanwhile, the catalyst used in the pretreatment hydrogenation process may be a noble metal or MoS-based catalyst which is similar to the catalyst of the process b) of hydroisomerization. Specifically, when the content of impurities in the oil fraction produced in the process a) of removing impurities is low, a noble metal catalyst may be applied to perform a pretreatment hydrogenation process. Here, when a Pd/r-$Al_2O_3$ catalyst is applied as an example of the noble metal catalyst, the conjugated diolefin may be sufficiently selectively removed even under mild conditions of 40 to 150° C. and a $H_2$ partial pressure of 10 to 40 bar. In addition, when the MoS-based catalyst is used, the temperature and the hydrogen pressure are somewhat higher as compared with the operation conditions of the noble metal catalyst, but the pretreatment hydrogenation process may be performed even under the conditions of lower temperature and hydrogenation pressure than the process b) of hydroisomerization.

Meanwhile, the pretreatment hydrogenation process may be performed, specifically, after the process a) of removing impurities and before the process b) of hydroisomerization, and thus, a problem in the conventional technology of removing Cl by $H_2$ feeding in a hydrotreating (HDT) process and the like, in which a waste plastic pyrolysis oil is cracked and removed in an organic-Cl form, may be prevented.

The pre-hydrotreatment process may be, as an example, a liquid hydrogenation process, and may be performed in a fixed bed reactor. Specifically, the liquid waste plastic pyrolysis oil from which impurities have been removed may be continuously injected to the fixed-bed reactor filled with a pretreatment hydrogenation catalyst and hydrogen in a counter-current or co-current direction, thereby performing pretreatment hydrogenation. However, the present invention is not limited thereto.

The method of producing a lubricating base oil composition of the present invention may further include separating an oil fraction which is hydroisomerized by the process b) by boiling points. As the separation process, a known fractional distillation method such as atmospheric distillation and reduced pressure distillation may be applied.

Another exemplary embodiment of the present invention provides a lubricating base oil composition produced by the method of producing a lubricating base oil composition. The lubricating base oil composition is a lubricating base oil composition produced from waste plastic pyrolysis oil having a boiling point in a range higher than 340° C., characterized by having a kinematic viscosity (@100° C.) of 3.9 to 4.7 cSt.

Specifically, the lubricating base oil composition may have a kinematic viscosity (@100° C.) of 4.0 to 4.7 cSt, 4.1 to 4.7 cSt, or 4.2 to 4.7 cSt, a viscosity index of 120 or more or 140 or more, CCS (low-temperature viscosity, @−35° C.) of 3,000 cP or less, 2800 cP or less, 800 to 2500 cP, or 900 to 2200 cP, and/or a pour point of −20° C. or lower or −60 to 20° C.

Meanwhile, the kinematic viscosity (@100° C.) may be measured in accordance with ASTM D445, the viscosity index may be measured in accordance with ASTM D2270, CCS was measured in accordance with ASTM 5293, and the pour point may be measured in accordance with ASTM D97.

The lubricating base oil composition may include 0 to 30 wt % of normal paraffin, 30 to 99 wt % of the isoparaffin, 0.1 to 40 wt % of naphthene with respect to the total weight. Specifically, the lubricating base oil composition may include 40 to 90 wt % or 50 to 80 wt % of isoparaffin with respect to the total weight. The lubricating base oil composition may include 0 to 30 wt %, 1 to 20 wt %, or 2 to 10 wt % of normal paraffin. The lubricating base oil composition may include 0.1 to 40 wt o, 1 to 30 wt o, 3 to 25 wt o, or 5 to 20 wt % of naphthene.

The lubricating base oil composition may include 70 wt % or more, specifically 80 wt % or more, preferably 90 wt % or more of the hydrocarbon oil fraction having a boiling point in a range of 340 to 450° C. with respect to the total weight.

The lubricating base oil composition may include less than 10 ppm, 5 ppm or less, or 2 ppm or less of chlorine (Cl), less than 10 ppm or 8 ppm or less of sulfur (S), and less than 50 ppm or less than 30 ppm of nitrogen (N).

Hereinafter, the preferred examples and the comparative examples of the present invention will be described. However, the following examples are only a preferred exemplary embodiment of the present invention, and the present invention is not limited thereto.

EXAMPLE 1

Figure 3:
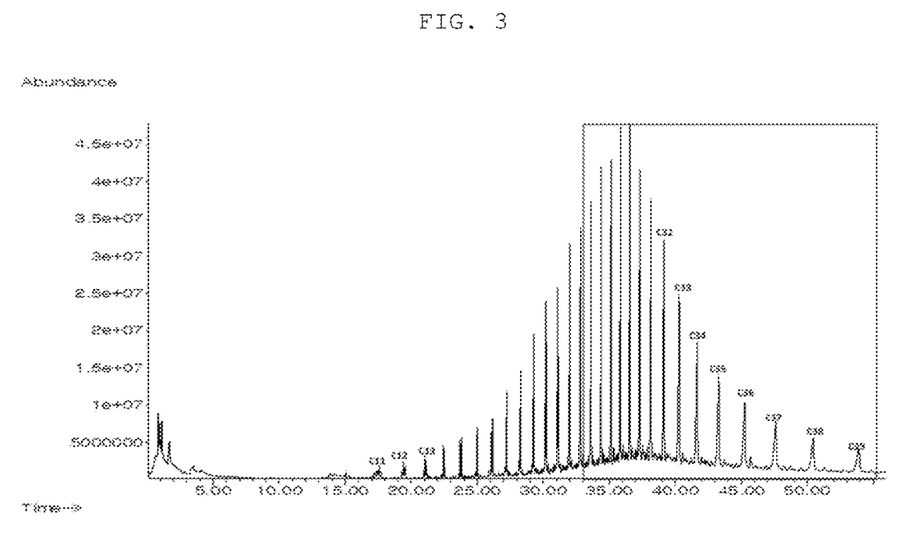
FIG. 3 is a graph showing GC-SimDist analysis for confirming a molecular weight distribution in waste plastic pyrolysis oil of Example 1.

Analysis of Composition of Waste Plastic Pyrolysis Oil Having High Content of Cl and AR Separation Waste plastic pyrolysis oil converted by pyrolysis of plastic waste was used as a raw material for producing lubricating base oil. In order to confirm the effect of impurity removal and a molecular weight change by the reaction, the following analysis was performed. In order to confirm a molecular weight distribution in the waste plastic pyrolysis oil, GC-SimDist analysis (HT-750) was performed. ICP, TNS, EA-O, and XRF analyses were performed for the impurities, Cl, S, N, and O. In addition, GC-MSD analysis was performed for olefin content analysis. The analysis results are shown in Tables 1, 2, and 3, and FIG. 3.

TABLE 1

| Cut Name | Expected carbon range | Boiling point (° C.) | Yield (wt %) |
| --- | --- | --- | --- |
| H-Naphtha. | ~C8 | <150 | 8.1 |
| KERO | C9-C17 | 150~265 | 24.4 |
| LGO | C18-C20 | 265~340 | 22.7 |
| VGO/AR | C21~ | >340 | 44.8 |
| SUM | — | — | 100 |

TABLE 2

| Pyrolysis oil | Cl | N | S | O |
| --- | --- | --- | --- | --- |
| mg/Kg | 67 | 348 | 20 | 1 |

In order to recover an AR oil fraction which is a subject oil fraction to be converted into the lubricating base oil by hydroisomerization, the waste plastic pyrolysis oil was separated by boiling points using a distillation device. H-naphtha was separated by a boiling point of −180° C. at a normal pressure, and a middle distillate was separated by reduced pressure distillation on a basis of 180 to 340° C. A remaining VGO/AR oil fraction having a boiling point of 340° C. higher was used as the raw material of the present invention.

Figure 4:
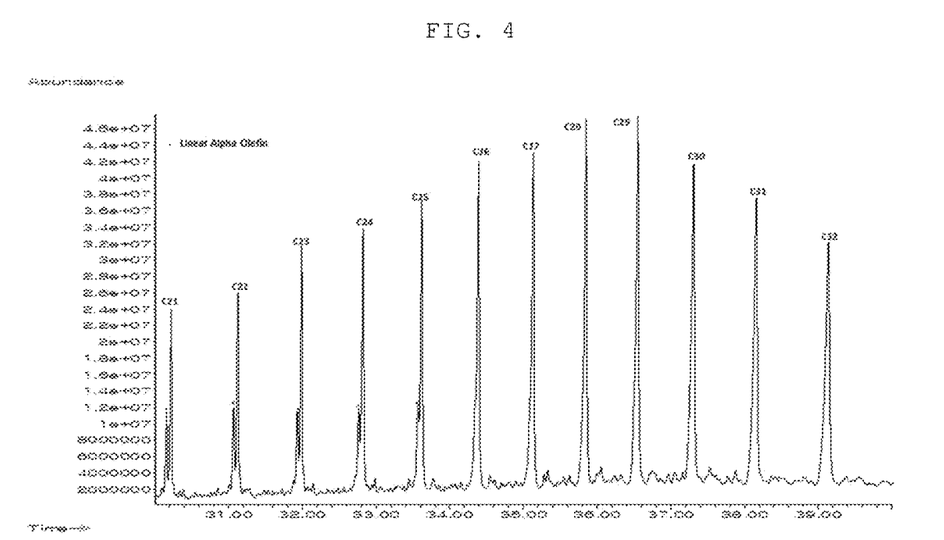
FIG. 4 is a graph showing 2D-GC analysis results of an AR oil fraction separated from the waste plastic pyrolysis oil of Example 1.

Hydrogenation process introduction criteria were determined on the basis of Cl which is an impurity causing the most serious problem such as corrosion and a reactor blockage phenomenon in the hydrogenation process. The representative impurity which may cause device corrosion by HCl conversion is Cl, which is the important impurity in reducing N causing a reactor blockage by forming a $NH_4Cl$ salt in the operation conditions with HCl. In the process of reducing impurities, impurities such as N, S, O, and metal in addition to Cl were removed simultaneously. The content of the impurities, Cl, S, N, and O in the separated AR oil fraction and the metal content are shown in the following Table 3. In addition, the 2D-GC analysis results are shown in FIG. 4. The AR oil fraction was confirmed to be a mixture of n-paraffin and olefins, and most of olefins was confirmed to be an alpha-olefin.

TABLE 3

|  | AR |
| --- | --- |
| Cl, wppm | 14 |
| S, wppm | 17 |
| N, wppm | 254 |
| O, wt % | 0.23 |
| Fe, wppm | N/D |
| Ca, wppm | 47.9 |
| Na, wppm | 25.1 |
| Al, wppm | N/D |

EXAMPLE 2

Cl Reduction and Structural Isomerization Reaction in Oil Fraction by Treatment at High Temperature with Solid Acid Material

EXAMPLE 2-1

Preparation of Solid Acid Material

Cl was removed from the liquid AR of Example 1, and a solid acid material was prepared for a structural isomerization treatment. As the solid acid material, RFCC E-cat., which is a material having a Bronsted or Lewis acid site, was used. The physical properties of the RFCC E-cat. used are shown in Table 4. In addition, the content of impurities included in the catalyst are shown in Table 5.

TABLE 4

| Type | | | | | | |
| --- | --- | --- | --- | --- | --- | --- |
|  | TSA ($m^2$/g) | ZSA ($m^2$/g) | MSA ($m^2$/g) | Z/M Ratio | PV (cc/g) | APD (Å) |
| RFCC E-cat | 122 | 36 | 86 | 0.42 | 0.20 | 67 |

In Table 4, TSA is a total specific surface area, ZSA is a zeolite specific surface area, MSA is a meso or larger pore specific surface area, Z/M is a ratio of the zeolite specific surface area (ZSA) to the meso or larger pore specific surface area, PV is a pore volume, and APD is an average pore diameter.

TABLE 5

| RFCC E-cat | | | | | | | | | | |
| --- | --- | --- | --- | --- | --- | --- | --- | --- | --- | --- |
| | Na | Ni | V | Fe | Mg | P | $La_2O_3$ | $CeO_2$ | $TiO_2$ | $SiO_2$ | $Al_2O_3$ |
| wt % | 0.13 | 0.53 | 1.21 | 0.65 | 0.07 | 0.56 | 0.69 | 0.10 | 0.78 | 40 | 53 |

The RFCC E-cat used was a catalyst having a total specific surface area of 122 $m^2$/g, a pore volume of 0.20 cc/g, and an average particle size of 79 μm.

EXAMPLE 2-2

Process of Impurity Reduction in AR Oil Fraction and Structural Isomerization by Solid Acid Material 99.9 kg of the AR oil fraction recovered in Example 1 and 30 kg of RFCC E-cat. were introduced to a 200 L autoclave, $N_2$ purging was performed three times, and it was confirmed that there was no leak in equipment by a leak test at 30 bar of $N_2$. Thereafter, $N_2$ was vented, the equipment was operated at 1 bar of $N_2$, and the reaction temperature was raised to 180° C. Subsequently, the temperature was maintained at 180° C. for 6 hours, and was lowered to room temperature with stirring to end the reaction. Thereafter, venting was performed at room temperature, the autoclave was released to recover a reactant and a waste catalyst, and filtration was performed to recover treated AR. The reaction was repeated until a Cl content was 2 wppm or less. Important change in the physical properties related to the lubricating base oil product before and after the reaction are shown in the following Table 6. It was confirmed that Cl, N, S, O, and the like were greatly decreased, and in particular, most of the metal was removed. In addition, as a result of pour point analysis, it was confirmed that the pour point after treatment with the solid acid catalyst was improved to 15° C. as compared with the pour point of the raw material of 43° C., and thus, low-temperature properties were improved. Thus, it was inferred that there was low-temperature properties improvement effect by a branching reaction by the treatment with the solid acid material and the shift of an unsaturated double bond.

TABLE 6

| | Cl (ppm) | N (ppm) | S (ppm) | O (wt %) | Fe (ppm) | Ca (ppm) | Na (ppm) | Al (ppm) |
|---|---|---|---|---|---|---|---|---|
| Before reaction (%) | 14 | 254 | 17 | 0.23 | N.D | 47.9 | 25.1 | N.D |
| After reaction (%) | 2 | 11 | 8 | 0.1 | 2.2 | 14.2 | 5.8 | N.D |

EXAMPLE 2-3

Structural Isomerization Process of Ar Cutting Oil Fraction Having Reduced Impurities The refined oil fraction recovered in Example 2-2 was subjected to a hydroisomerization reaction using a fixed bed continuous reactor. The refined oil fraction recovered in Example 2-2 was separated into oil fractions having boiling points of 405 to 470° C. and 470 to 490° C. An oil fraction having a boiling point of 405 to 470° C. was named 100D core and an oil fraction having a boiling point of 470 to 490° C. was named 100D heavy, and the specific gravity, the kinematic viscosity, and the viscosity index of the oil fractions were analyzed and are shown in the following Table 7.

TABLE 7

| Main physical properties of feed | 100D Core | 100D Heavy |
|---|---|---|
| Cut Range, ° C. | 405~470 | 470~490 |
| Sp. Gr@60/60° F. | 0.8269 | 0.8314 |
| KV @100° C., cSt | 3.817 | 4.760 |
| VI | 175 | 185 |

In order to confirm whether the pyrolysis oil may be applied as a lubricating base oil by the hydroisomerization reaction, the hydroisomerization reaction of 100D core and 100D heavy oil fractions was performed. Each catalyst was loaded sequentially to the catalyst bed for the structural isomerization reaction and the catalyst bed for hydrofinishing reaction and the hydroisomerization reaction was performed. A Pt/zeolite catalyst having 1-dimensional pores was used in the hydroisomerization reaction and a PtPd/$SiO_2$—$Al_2O_3$ catalyst was used in the hydrofinishing reaction. The physical properties of the used catalysts are shown in Table 8.

TABLE 8

| Catalyst | Surface area ($m^2$/g) | | | pore volume (cc/g) | Average pore diameter (Å) | Metal dispersion (%) |
|---|---|---|---|---|---|---|
| | Total | micro | external | | | |
| Isomerization catalyst | 199.4 | 71.9 | 127.5 | 0.34 | 69.5 | 73.1 |
| Finishing catalyst | 366.1 | 15.8 | 350.3 | 0.74 | 81.0 | 66.7 |

6 cc of the hydroisomerization catalyst and 4 cc of the hydrofinishing catalyst were loaded to the fixed bed continuous reactor, and the catalyst was activated by the following process. The temperature was raised to 120° C. at a rate of 2° C./min under the conditions of $N_2$ normal pressure 100 sccm and then maintained for 2 hours to remove the impurities on the surface of the catalyst. Thereafter, $N_2$ was changed to $H_2$, and a $H_2$ pressure was increased to 35 bar at a rate of 10 bar/10 min. Thereafter, the temperature was raised at a rate of 2° C./min, maintained at 150° C. for 2 hours, raised at a rate of 2° C./min, and maintained at 330° C. for 5 hours to subject the catalyst to reduction activation. Thereafter, the temperature was slowly lowered to 150° C., and then the pressure was decreased to 25 bar. Subsequently, each of the 100D core oil fraction and the 100D heavy oil fraction was introduced. Introduction was performed at a flow rate of 0.02 sccm, the flow rate was maintained for 5 hours, and the catalyst was wetted. Thereafter, the temperature was lowered to 310° C. under the condition of WHSV of 0.6 $h^{-1}$, and then raised to 320° C. to recover a sample after the stabilization step.

In order to confirm the physical properties of the lubricating base oil of the recovered sample, the sample was cut on the basis of 400° C. to recover only the oil fraction of 400° C. or higher. In order to confirm the physical properties of the lubricating base oil of the recovered oil fraction, the pour point, the fog point, Noack volatility, the kinematic viscosity, and the viscosity index physical properties were analyzed, and are shown in Table 9.

TABLE 9

| Physical properties | 100D Core | 100D Heavy | [Reference] Commercial Gr III lubricating base oil | |
|---|---|---|---|---|
| | | | Typical | Spec. |
| Pour Point, ° C. | −21 | −30 | −18 | Max. −18 |
| Cloud Point, ° C. | −21 | −23 | — | — |
| Noack@250° C., % | 13.4 | <13.0 | 13.0 | Max. 13.5 |
| KV@100° C., cSt | 4.231 | 4.673 | 4.16 | 4.15-4.25 |
| VI | 139 | 142 | 133 | Min. 131 |

As a result of analyzing the physical properties of the lubricating base oil, the physical properties after the hydroisomerization reaction of the 100D core and the 100D heavy oil fractions were good, as follows: the pour point of −21° C. or lower, the fog point of −21° C. or lower, Noack volatility of 13.4 or less, and the viscosity index of 139 or more. The kinematic viscosity which determines the product range was 4.2 to 4.7 cSt (@100° C.) as a kinematic viscosity at 100° C., and thus, it was confirmed that the lubricating base oil was applied as a product in a kinematic viscosity level of 4 cSt which is the most in-demand product in the lubricating base oil products.

EXAMPLE 2-4

Structural Isomerization Process of AR oil Fraction Having Reduced Impurities The refined oil fraction recovered in Example 2-2 was hydroisomerized for a mixed oil fraction, using a fixed-bed continuous reactor without cutting. Operation was performed under the catalyst loading and operation conditions which were the same as the catalyst and the operation conditions of Example 2-3.

Figure 5:
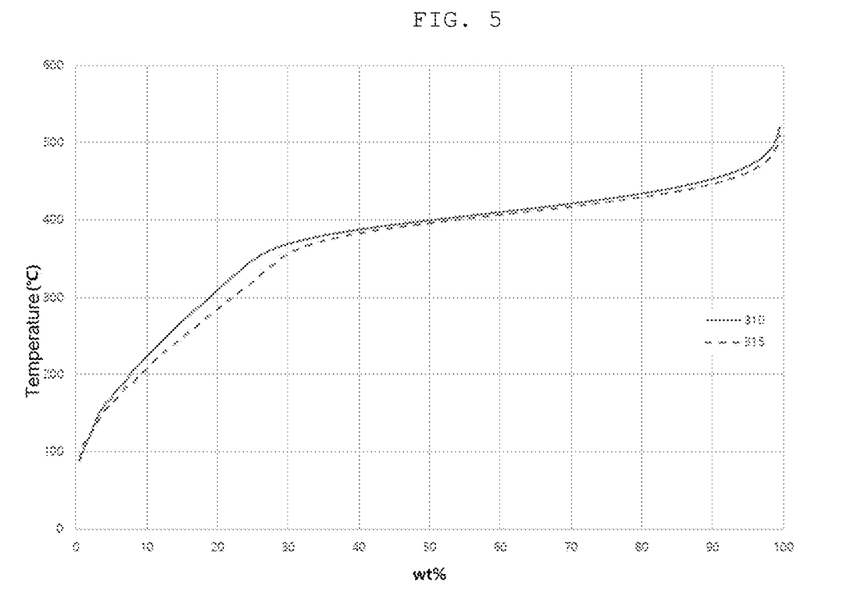
FIG. 5 is a graph showing SimDist pattern of an oil fraction hydroisomerized at 310° C. and an oil fraction hydroisomerized at 315° C. of Examples 2 to 4.

6 cc of the hydroisomerization catalyst and 4 cc of the hydrofinishing catalyst were loaded to the fixed bed continuous reactor, and the catalyst was activated by the following process. The temperature was raised to 120° C. at a rate of 2° C./min under the conditions of $N_2$ normal pressure 100 sccm and then maintained for 2 hours to remove the impurities on the surface of the catalyst. Thereafter, $N_2$ was changed to $H_2$, and a $H_2$ pressure was increased to 35 bar at a rate of 10 bar/10 min. Thereafter, the temperature was raised at a rate of 2° C./min, maintained at 150° C. for 2 hours, raised at a rate of 2° C./min, and maintained at 330° C. for 5 hours to subject the catalyst to reduction activation. Thereafter, the temperature was slowly lowered to 150° C., and then the pressure was decreased to 25 bar. Subsequently, the oil fraction recovered in Example 2-2 was introduced at 0.02 sccm and maintained for 5 hours to wet the catalyst. Thereafter, the oil introduction amount was increased to 0.12 sccm, the temperature was raised to 310° C., and then the sample after an initial stabilization step was recovered. The sample hydroisomerized at 310° C. was recovered in the same manner, and then the sample hydroisomerized at 315° C. was recovered, respectively. The SimDist pattern of the oil fractions recovered at 310° C. and 315° C. is shown in FIG. 5.

The recovered oil fractions were mixed and cut at 400° C., and then a 100N sample was recovered. Thereafter, the physical properties of the lubricating base oil for the 100N sample were analyzed. The analysis results are shown in the following Table 10.

TABLE 10

| Item | Method | 100N | Typical Gr III+ | Gr III+ Spec |
|---|---|---|---|---|
| Sp. Gr., @15/4° C. | D1298 | 0.8274 | 0.826 | Report |
| Saybolt color | D156 | +30 | +30 | Min. +27 |
| KV 100° C., cSt | D445 | 4.243 | 4.16 | 4.00-4.25 |
| VI | D2270 | 138 | 133 | Min. 131 |
| CCS, −30° C., cP | D5295 | 1,180 | 1,160 | Max. 1,250 |
| CCS, −35° C., cP | D5296 | 1,930 | 2,000 | Report |
| Pour/Cloud point, ° C. | D97/D2500 | −24/−23 | −18/−12 | PP Max. −18 |
| Noack Volatility, @250° C., wt % | D5800 | 10.9 | 13.0 | Max. 13.5 |

As a result of analyzing the physical properties of the sample, the sample showed superior physical properties to those of the Group III plus having superior physical properties to those of the typical group III lubricating base oil. It was confirmed that the specific gravity, the Saybolt color, the kinematic viscosity (@100° C.), and the viscosity index of the same all satisfied the criteria of the physical properties of the Group III plus. As the viscosity index is high, the physical properties of the lubricating base oil are better, and it was confirmed that the sample produced by the present invention had a higher viscosity index than the typical Group III plus viscosity index, and thus, had superior physical properties. The CCS physical properties were similar to the physical properties of the Group III plus, and the pour point and the fog point were lower than the physical properties of the typical Group III plus, and thus, were superior. It was confirmed that Noack volatility was also lower than the physical properties of the Group III plus, and thus, was superior.

The results of analyzing the contents of isoparaffin, olefins, naphthenes, and aromatics in the sample are shown in Table 11. It was confirmed that the sample produced in Example 2-4 had a lower content of isoparaffin and higher contents of 1-ring and 2-ring naphthene than the typical Group III plus lubricating base oil. However, the content of 3-ring naphthene which adversely affects the viscosity index of the lubricating base oil was lower than that of the typical Group III plus lubricating base oil.

TABLE 11

| Classification | | 100N | Typical Gr III+ |
|---|---|---|---|
| Iso-Paraffin | — | 68.0 | 75.0 |
| Naphthen. | 1-Ring | 27.0 | 18.9 |
| | 2-Ring | 3.4 | 2.9 |
| | 3-Ring | 1.6 | 3.3 |
| Olefin, Aromatics | — | N/D | N/D |
| Total | — | 100.0 | 100.0 |

The results of analyzing the oxidation stability and the total acid number of the lubricating base oil are shown in Table 12. As a result of analyzing oxidation stability, it was confirmed that the oxidation stability was a little inferior to that of the typical Group III plus lubricating base oil, but there was no great difference between them. Carboxylic acid was not analyzed.

TABLE 12

| Analysis | method | 100N | Typical Gr III+ |
|---|---|---|---|
| RBOT, min | D2112 | 439 | 508 |
| TAN, mgKOH/g | D664 | L0.01 | L0.01 |

Figure 6:
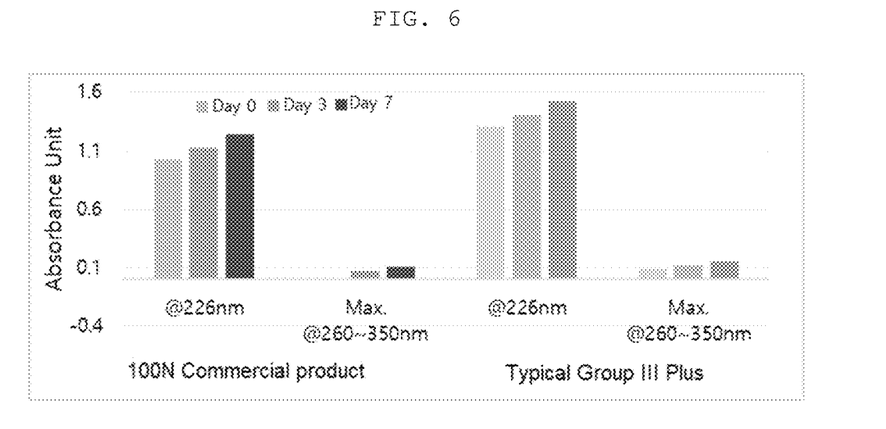
FIG. 6 is a graph showing UV stability analysis results of 100N, the samples produced in Examples 2 to 4 and typical Group III plus lubricating base oil.

The results of UV stability are shown in FIG. 6. It was confirmed that the UV stability of the sample 100N produced by the present invention was not greatly different from the typical Group III plus lubricating base oil.

For confirming the content of impurities in the lubricating base oil, analysis of S, N, and metal contents was performed, and the results are shown in Table 13. As a result of analysis, it was confirmed that a large amount of impurities present in the raw material was mostly removed in the treatment process, and the impurity content in the 100N sample produced was not greatly different from that of the typical Group III plus lubricating base oil.

TABLE 13

| Item | Method | Raw material | 100N | Typical Group III+ |
|---|---|---|---|---|
| Sulfur, ppm | D5453 | 6 | 0.42 | 0.39 (Max. 10) |
| Nitrogen, ppm | D4629 | 5.2 | 0.38 | 0.30 |
| As, ppb | ICP | 1.5 | <1 | <1 |
| Hg, ppb | | <1 | <1 | <1 |
| Na, ppm | | N/D | | N/D |
| Ca3), ppm | | 5.5 | | (<1 ppm) |

TABLE 13-continued

| Item | Method | Raw material | 100N | Typical Group III+ |
|---|---|---|---|---|
| Fe, ppm | | 1.7 | | |
| Al, ppm | | 1.8 | | |
| Total Cl, ppm | IC-Anion | 3 | | |
| Ni, V, Si, Mg, P = N/D | | | | |

As a result, it was confirmed that the physical properties of the lubricating base oil produced were superior to those of the Group III lubricating base oil, and had equivalent to or better than those of the typical Group III plus lubricating base oil.

In the present invention, AR waste plastic pyrolysis oil having a boiling point in a range higher than 340° C. is treated to remove impurities such as Cl, S, N, and metal and be structurally isomerized, and then hydroisomerized, thereby producing lubricating base oil having improved low-temperature properties with more methyl branches than petroleum-based lubricating base oil.

The present invention is characterized by a method of producing a lubricating base oil which produces lubricating base oil having a kinematic viscosity of 4.1 to 4.3 cSt in a selectivity of 70% or more, preferably 80% or more.

In addition, the present invention is preferred in terms of environmental protection, since waste plastic which may be converted into greenhouse gas or hazardous gas such as SON, NOR, and Cl-containing gas when discarded or burned, is converted into industrially widely used lubricating base oil.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

The invention claimed is:

1. A method of producing a lubricating base oil composition, the method comprising:
 a) reacting at least a part of waste plastic pyrolysis oil having a boiling point in a range higher than 340° C. with a solid acid material to remove impurities and structurally isomerize the oil; and
 b) hydroisomerizing at least a part of the product of process a) wherein the process a) of removing impurities and structurally isomerizing satisfies the following Relation 1:

$$5 < A-B < 30 \quad \text{[Relation 1]}$$

wherein A and B are pour points of the waste plastic pyrolysis oil before structural isomerization (A) and after structural isomerization (B), respectively.

2. The method of producing a lubricating base oil composition of claim 1, further comprising:
 before the process a), separating at least a part of the waste plastic pyrolysis oil into a first oil fraction, a second oil fraction, and a third oil fraction,
 wherein the first oil fraction has a boiling point of higher than 340° C., the second oil fraction has a boiling point of lower than 180° C., and the third oil fraction has a boiling point of 180 to 340° C.

3. The method of producing a lubricating base oil composition of claim 1, wherein the waste plastic pyrolysis oil in the process a) includes 10 wt % or more of olefins with respect to a total weight.

4. The method of producing a lubricating base oil composition of claim 1, wherein the solid acid material is zeolite, clay, silica-alumina-phosphate (SAPO), aluminum phosphate (ALPO), metal organic framework (MOF), silica, alumina, or a mixture thereof.

5. The method of producing a lubricating base oil composition of claim 1, wherein the solid acid material is included at 3 to 30 wt % with respect to a total weight of the waste plastic pyrolysis oil and the solid acid material.

6. The method of producing a lubricating base oil composition of claim 1, wherein the waste plastic pyrolysis oil from which impurities have been removed by the process a) includes less than 10 ppm of chlorine and 5 vol % or less of olefins with respect to the total weight.

7. The method of producing a lubricating base oil composition of claim 1, wherein the process b) includes reacting at least a part of the product of the process a) with a hydroisomerization catalyst,
 wherein the hydroisomerization catalyst includes: at least one metal selected from the group consisting of platinum (Pt), palladium (Pd), nickel (Ni), iron (Fe), copper (Cu), chromium (Cr), vanadium (V), and cobalt (Co); and
 at least one support selected from the group consisting of alumina, silica, silica-alumina, zirconia, ceria, titania, zeolite, and clay.

8. The method of producing a lubricating base oil composition of claim 1, further comprising: c) separating the waste plastic pyrolysis oil hydroisomerized in the process b) by boiling points.

9. The method of producing a lubricating base oil composition of claim 1, wherein the process b) of hydroisomerization satisfies the following Relation 2:

$$0.95 < C/D < 1.05 \quad \text{[Relation 2]}$$

wherein C and D are weight average molecular weights of the waste plastic pyrolysis oil from which impurities have been removed before hydroisomerization (C) and after hydroisomerization (D), respectively.

* * * * *